(12) United States Patent
Pau

(10) Patent No.: US 12,742,982 B2
(45) Date of Patent: Sep. 22, 2026

(54) PROGRAMMABLE WAVEGUIDE DEVICES AND METHODS

(71) Applicant: Arizona Board of Regents on Behalf of the University of Arizona, Tucson, AZ (US)

(72) Inventor: Stanley Pau, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 246 days.

(21) Appl. No.: 18/560,879

(22) PCT Filed: May 25, 2022

(86) PCT No.: PCT/US2022/030932
§ 371 (c)(1),
(2) Date: Nov. 14, 2023

(87) PCT Pub. No.: WO2022/251365
PCT Pub. Date: Dec. 1, 2022

(65) Prior Publication Data

US 2024/0255788 A1 Aug. 1, 2024

Related U.S. Application Data

(60) Provisional application No. 63/194,321, filed on May 28, 2021.

(51) Int. Cl.
*G02F 1/13* (2006.01)

(52) U.S. Cl.
CPC .................................. *G02F 1/1326* (2013.01)

(58) Field of Classification Search
CPC ................. G02F 1/1326; G02F 1/0151; G02F 1/134336; G02F 1/065; G02F 1/315
See application file for complete search history.

(56) References Cited

U.S. PATENT DOCUMENTS 4,720,172 A 1/1988 Baker
7,071,268 B1 7/2006 Lindsay et al.
(Continued)

OTHER PUBLICATIONS

Camacho, Miguel, et al., "A single inverse-designed photonic structure that performs parallel computing," Nature Communications 12:1466, 2021.
(Continued)

*Primary Examiner* — John Bedtelyon
(74) *Attorney, Agent, or Firm* — Perkins Coie

(57) ABSTRACT

Programmable waveguide devices and associated methods are described. The waveguide devices can be programmed to operate as an optical switch, an optical attenuator, an interferometer, a mode transformer, an optical computer or other devices. An example programmable waveguide device includes a grid where an electro-optic material is positioned between a plurality of top and bottom electrodes that each form a pair of electrodes as part of a grid element. The programmable waveguide device also includes input ports and output ports; the latter output one or more beams produced from the one or more input beams after propagation through the grid. Each grid element can receive a voltage across the electro-optic material of the grid element, which exhibits different indices of refraction depending on the voltage. The grid elements are thus configurable to produce regions within the grid with varying indices of refraction based on the voltage.

19 Claims, 12 Drawing Sheets

(56) References Cited

U.S. PATENT DOCUMENTS

| | | | | |
|---|---|---|---|---|
| 8,244,077 | B1 | 8/2012 | Yap | |
| 9,046,704 | B2 * | 6/2015 | Costache | G02F 1/313 |
| 2017/0371226 | A1 | 12/2017 | Song et al. | |

OTHER PUBLICATIONS

International Search Report and Written Opinion mailed on Sep. 2, 2022 for International Patent Application No. PCT/US2022/030932 (13 pages).

* cited by examiner 530
531
532
533
534
535
520
521
522
523
524
510
511
512
513
514
515
516

720
725
721
727
722
723
724
726
710
715
711
717
712
713
714
716

PROGRAMMABLE WAVEGUIDE DEVICES AND METHODS

CROSS-REFERENCE TO RELATED APPLICATION(S)

This patent document is a 371 National Stage Application of International Patent Application No. PCT/US2022/030932, filed May 25, 2022, which claims priority to the provisional application with Ser. No. 63/194,321, titled "PROGRAMMABLE WAVEGUIDE DEVICE," filed May 28, 2021. The entire contents of the above noted applications are incorporated by reference as part of the disclosure of this document.

TECHNICAL FIELD

The technology described in this patent document generally relates to optical waveguides and more specifically to optical waveguides that can be programmed to operate as different optical devices.

BACKGROUND

A waveguide is a structure for guiding light by restricting the spatial region in which the light can propagate. Most waveguides exhibit two-dimensional guidance by permitting propagation of light in generally only one dimension while restricting the spatial extent of the guided light in other dimensions. Due to their versatility for delivering light from one location to another, waveguides find many uses and are included in many applications such as optical fiber communication, optical interferometry, maintaining high optical intensities in non-linear devices and optical mode conversion. Waveguides are also key components in integrated optics and photonics integrated circuits and serve to guide light from one region to another.

SUMMARY

The disclosed embodiments relate to programmable waveguide devices and associated methods. The disclosed waveguide devices can be programmed to operate as any one of an optical switch, optical attenuator, interferometer, mode transformer and optical computer. In some embodiments, an array of electrodes is utilized to create a distribution of electric field intensities which changes the orientation of liquid crystal molecules in a cell, creating a corresponding spatial distribution of refractive index in a slab geometry. In some embodiments, light propagates from one edge of the cell as an input, travels through the distribution of refractive index, and propagates out into the same or another edge of the cell as an output. In another embodiment, an array of electrodes is utilized to create a distribution of refractive index in a slab layer of electro-optics or thermo-optics materials. Some of the applications of the disclosed devices and methods include telecommunication, image analysis and optical computing.

DETAILED DESCRIPTION

For the purposes of discussion, the examples described herein include liquid crystals, but similar approaches apply to electro-optic and thermo-optics materials. Liquid crystals are anisotropic molecules that can be oriented in different directions. Unlike liquids, such as liquid water which is isotropic and is made up of water molecules oriented in random directions, liquid crystals, which usually are made of rod and disk-shaped molecules, are not completely disordered and have some degree of alignment. Many liquid crystal molecules are polarizable and can be oriented by external electric and/or magnetic fields. Liquid crystals can be classified into thermotropic, lyotropic and metallotropic phases. Thermotropic liquid crystal phases exhibit various alignment and orientation orders in different ranges of temperature. Lyotropic liquid crystal phases have properties that are dependent on the concentration of its components. Metallotropic liquid crystal phases have properties that are determined by both composition and temperature. Thermotropic liquid crystals are used extensively in liquid crystal displays. Some thermotropic phases for display applications are nematic, smectic and cholesteric phases.

Figure 1:
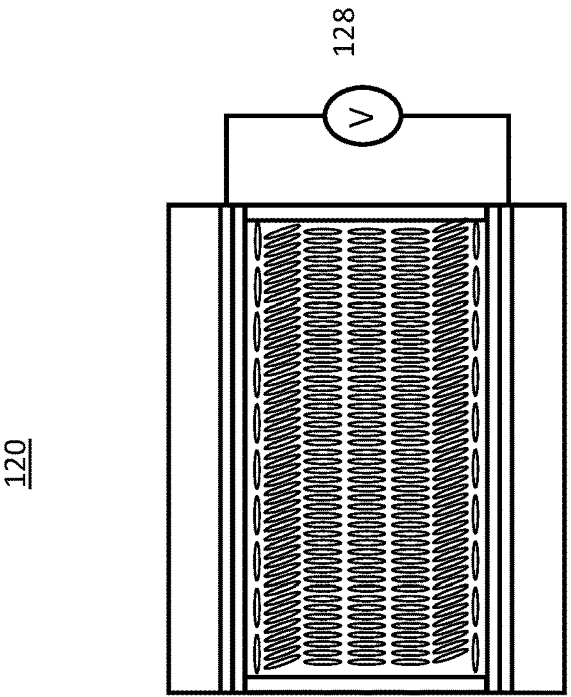
FIG. 1 illustrates cross sections of an example liquid crystal cell in two different configurations.
Figure 1:
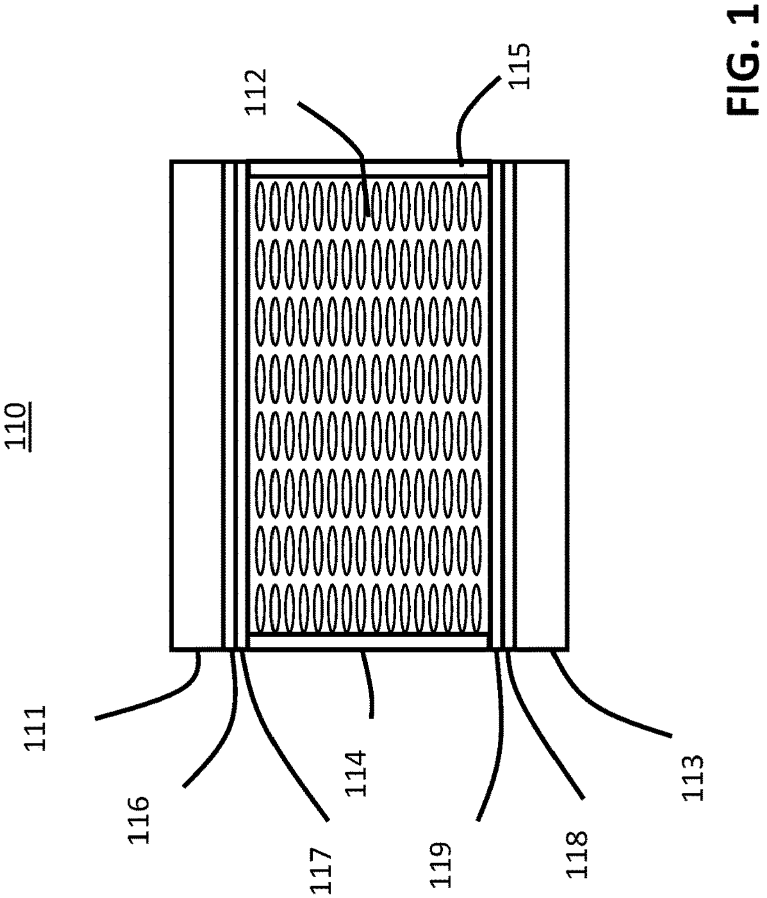

The operating principle of liquid crystal cells is illustrated in FIG. 1, which shows the cross section of a liquid crystal cell filled with a liquid crystal material in two different configurations. An example liquid crystal cell 110 includes a top substrate 111, liquid crystals 112, a bottom substrate 113 and spacers 114 and 115. The spacers 114, 115 fix the separation distance between the top and bottom substrates 111, 113 and enclose the liquid crystal 112. The top substrate 111 has a layer of conducting material 116 and an alignment layer 117. Similarly, the bottom substrate 113 has a layer of conducting material 118 and an alignment layer 119. The conducting materials 116, 118 serve as electrodes. The alignment layers 117, 119 are utilized to anchor the liquid crystal molecules to a predefined orientation, parallel to the substrate in this example. The configuration in the right-hand side of FIG. 1 illustrates the liquid crystal cell 120, where the top and bottom electrodes are connected to an external voltage 128. In this configuration, the liquid crystal molecules inside the cell are aligned to the direction of the electric field generated by the electrodes. The refractive indices inside the liquid crystal cells are different for the configurations in 110 and 120 because of the different orientations of the liquid crystal molecules inside the cell due to the application of external voltage 128.

Figure 2A:
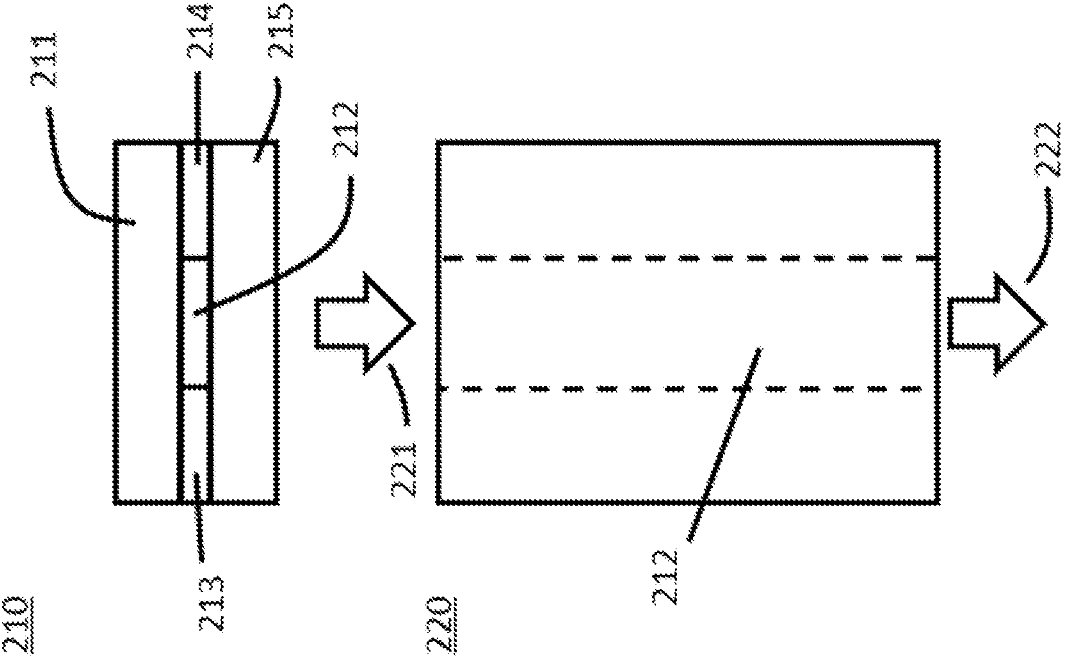
FIG. 2A illustrates cross-sectional and top views of an example planar slab waveguide.

FIG. 2A illustrates the cross-sectional view 210 (top figure) and top view 220 (bottom figure) of an example planar slab waveguide. The example planar waveguide in FIG. 2A includes a top cladding 211, a core 212, side claddings 213 and 214 and a bottom cladding 215. Incident light 221 enters the high index core 212 from one side, propagates within the high index core 212, and exits the high index core 212 from another side as output light 222. The refractive indices of the cladding are chosen to be less than that of the core 212. The waveguide is generally made of low loss dielectric materials, and the dimensions of the waveguide are chosen to allow propagation of a single mode or multiple optical modes. In some applications, the refractive index of the dielectric waveguide can be tuned by temperature and electric field, for example by using multiple electrodes fabricated near the cladding materials.

The dielectric tensor, $\varepsilon_{i,j}$, of an anisotropic material in a coordinate system defined by the principal axes of the material is related to the refractive indices of the material.

$$\varepsilon_{i,j} = \varepsilon_0 \begin{bmatrix} n_x^2 & 0 & 0 \\ 0 & n_y^2 & 0 \\ 0 & 0 & n_z^2 \end{bmatrix}.$$

Here, $n_x$, $n_y$, $n_z$ are the refractive indices for the light that is polarized in the x, y and z directions, respectively, i.e., linear polarized light with electric field components $E_x$, $E_y$, $E_z$, respectively. Further, $\varepsilon_0$ is the vacuum permittivity. For a liquid crystal material, which is inherently anisotropic, the values of the refractive indices can be different for different field components as shown in the dielectric tensor. The values of the index depend on the orientation of the liquid crystal molecules.

Figure 2B:
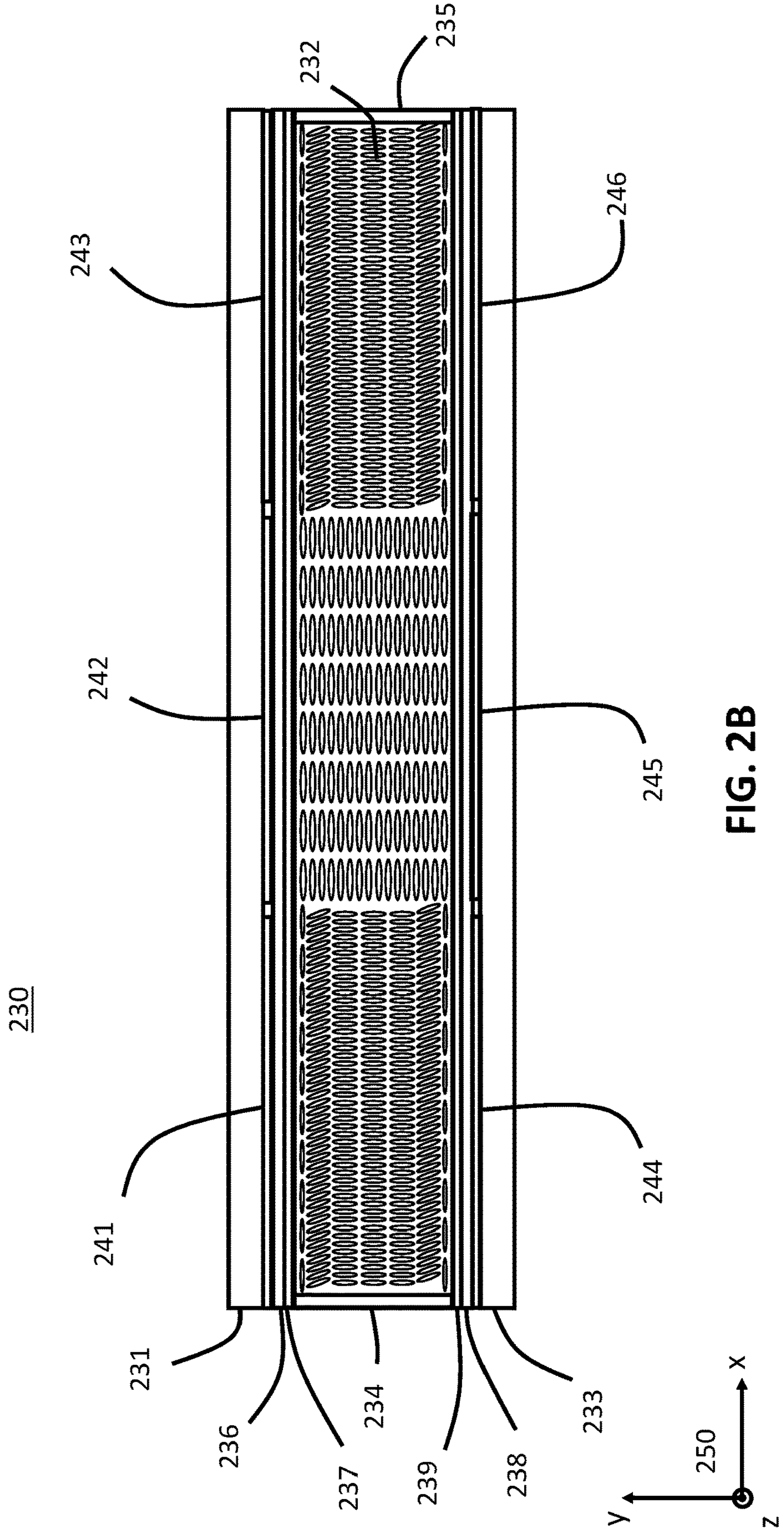
FIG. 2B illustrates a cross-sectional view of a tunable liquid crystal planar slab waveguide in accordance with an example embodiment.

FIG. 2B illustrates a cross-sectional view of a tunable liquid crystal planar slab waveguide in accordance with an example embodiment. The liquid crystal cell 230 includes a top substrate 231, liquid crystals 232, a bottom substrate 233 and spacers 234, 235. The spacers 234, 235 fix the separation distance between the top and bottom substrates and enclose the liquid crystals 232. The top substrate 231 has three electrodes 241, 242, 243, a top waveguide cladding layer 236 and an alignment layer 237. Similarly, the bottom substrate 233 has three electrodes 244, 245, 246, a bottom waveguide cladding layer 238 and an alignment layer 239. The electrodes are spatially separated. The alignment layers are utilized to anchor the liquid crystal molecule to a predefined orientation, parallel to the substrate in this example.

Voltages are applied between electrodes 241 and 244 and between electrodes 243 and 246, creating three regions with different refractive indices inside the liquid crystal cell. In the configuration shown in FIG. 2B, no voltage is applied to the center set of electrodes 242, 245, but, in general, those electrodes can be connected to a different voltage than those applied to electrodes 241, 244 or 243, 246 to produce the desired variations in the indices of refraction in the three regions.

In this waveguide, light propagates along the z-axis. The refractive index experienced by the light that is polarized parallel to the x-axis is different from the refractive index for the light that is polarized parallel to the y-axis. For the particular example configuration shown in FIG. 2B, the light that is polarized parallel to the x-axis has a higher refractive index in the region between electrodes 242 and 245 and has a lower refractive index in the regions between electrodes 241 and 244 and between electrodes 243 and 246. The region between electrodes 242 and 245 serves as a high index core, similar to the core 212 in the planar waveguide in FIG. 2A. In this configuration, light that is polarized parallel to the y-axis experiences a lower refractive index when traveling in the region between electrodes 242 and 245 and experiences a higher refractive index when traveling in the regions between electrodes 241 and 244 and between electrodes 243 and 246.

The dimensions of the three regions depicted in FIG. 2B can be configured to accommodate the various applications of the disclosed programmable waveguide devices. For example, in applications where single-mode propagation of input light is needed, the center region can be dimensioned to be approximately the same as the dimensions of the propagating mode or no more than 20% larger than the dimensions of the propagating mode. For a single-mode, the lateral dimensions of the light propagating region along the x and y axis is around $$\frac{\lambda}{2n_{eff}},$$

where $\lambda$ is the wavelength of light and $n_{eff}$ is the mode effective index. The dimensions of the side regions can be configured to be, for example, equal to, or larger than, the length of the tail of the expected evanescent wave associated with the propagating light. For a propagating mode in a waveguide, the intensity of the evanescent wave can be described as a dying exponential function of the distance in the cladding regions of the waveguide. The intensity of the evanescent wave can be described as $$I(x) = I_0 \exp\left(-\frac{x}{d}\right),$$

where $I_0$ is a constant and d is a decay length.

$$d = \frac{\lambda}{4\pi n_h}\left(\sin(\theta)^2 - (n_l/n_h)^2\right)^{-1/2}$$

where $\theta$ is the angle of incident, $n_l$ is the index of the low index region and $n_h$ is the index of the high index region. As described herein, implementations of the programmable waveguide devices can include a large number of controllable elements (e.g., 1 million to 10 million elements) that can be actuated individually or collectively to produce the desired regions with particular indices of refraction.

In some embodiments, the voltages on the electrodes can be set to be zero or a maximum voltage $V_{max}$, such that the refractive index can be equal to two different values. In other embodiments, the voltages on the electrodes can be set to be any voltage between zero and $V_{max}$. The refractive index of any given spatial region in this case is equal to a range of values.

Figure 3:
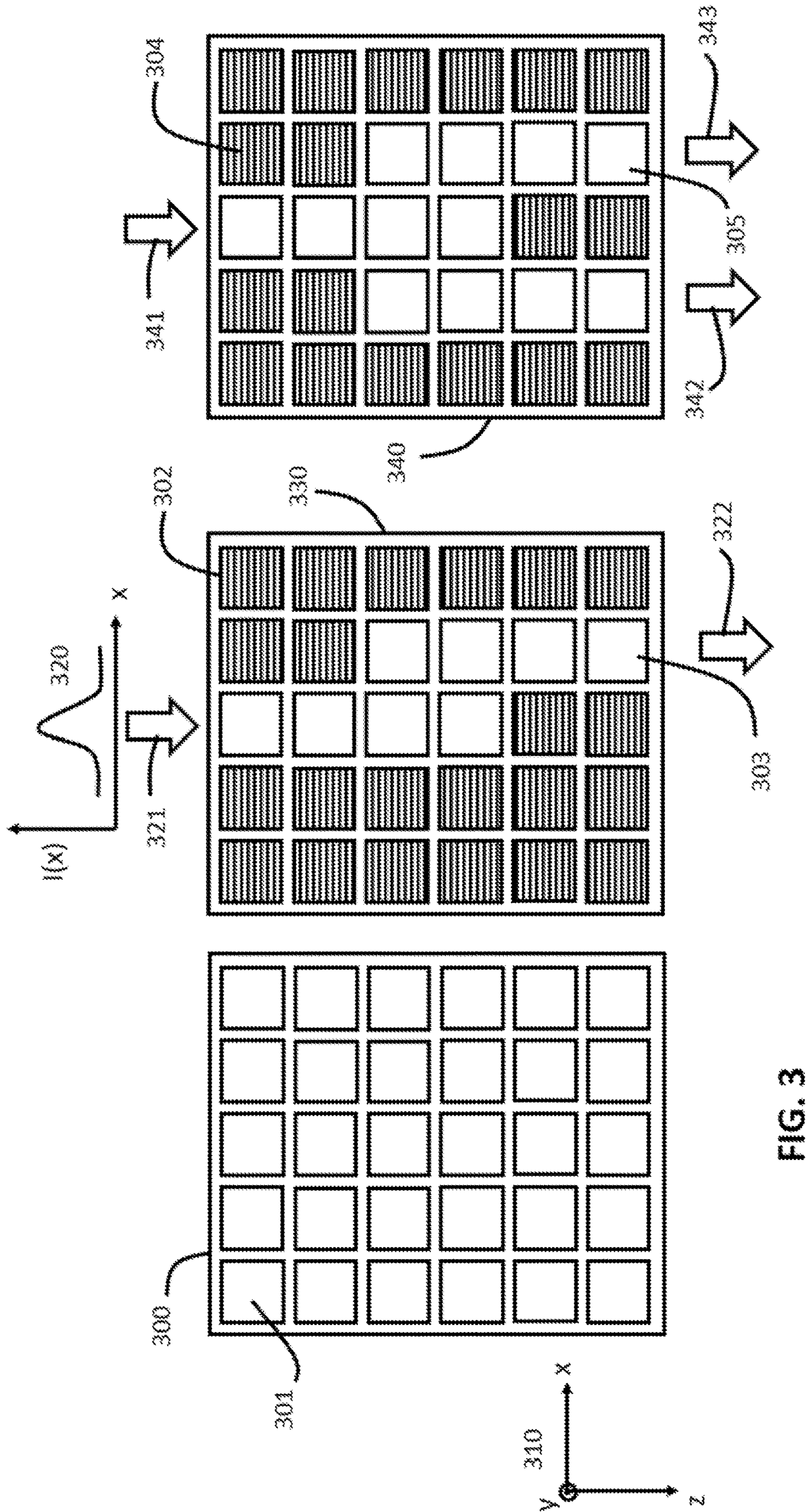
FIG. 3 shows a top view of a tunable and programmable liquid crystal planar slab waveguide in accordance with an example embodiment.

FIG. 3 shows the top view of a tunable and programmable liquid crystal planar slab waveguide in accordance with an example embodiment. The liquid crystal cell 300 (left-hand side of FIG. 3) has an array of electrodes 301 on both the top and bottom substrates, similar to that in FIG. 2B. None of the electrodes in 300 has an applied voltage.

The liquid crystal cell 330 (middle configuration in FIG. 3) is the same cell 300 with voltages applied to some of the electrodes. In the depicted example, a voltage value is applied to each electrode that is denoted with horizontal fill lines (e.g., square 302), and electrodes denoted without fill lines have no applied voltage. As noted earlier, the voltages applied to each electrode can vary between zero and $V_{max}$ values, or can be equal to one of only two values (e.g., no voltage and a constant voltage). The electrode pattern defines a planar liquid crystal waveguide with, for example, a high core index for light polarized parallel to the x-axis and propagating along the z-axis. The shape of the waveguide is defined by the actuation of the electrodes. In the middle configuration shown in FIG. 3, light with an intensity profile 320 is input to the slab waveguide (arrow 321), propagates from one end 321 of the slab waveguide to another end of the slab waveguide, and exits the waveguide (arrow 322) at an offset position with respect to the position where the light was input.

The right-hand side of FIG. 3 shows another configuration where the input light 341 enters the slab 340 and, based on the activation of electrodes 304, 305 (or lack thereof), two output light beams 342 and 343 are produced. The split ratio of the light may be 50-50, 70-30, or other proportions. In addition, the one-input to two-output splitter can be cascaded to connect to another one-input to two-output splitter to form a one-input to three-output splitter with different split-light proportions. More generally, a one-input to N-output splitter, where N is an integer, can be defined by the multitude of electrodes.

Figure 4:
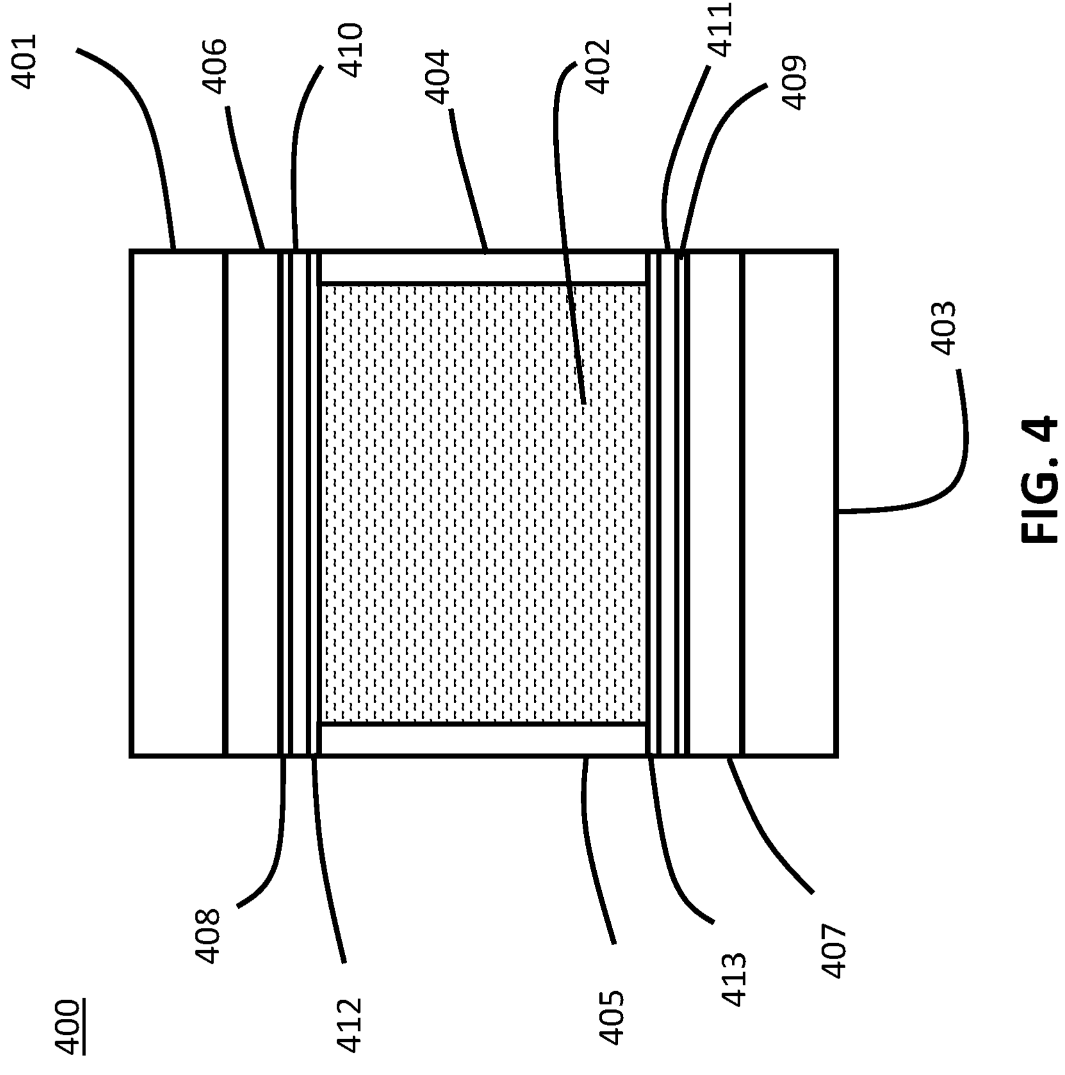
FIG. 4 shows the cross-sectional view of a tunable and programmable liquid crystal planar slab waveguide in accordance with another example embodiment.

FIG. 4 shows the cross-sectional view of a tunable and programmable liquid crystal planar slab waveguide 400 in accordance with another example embodiment. The liquid crystal cell includes a top substrate 401, liquid crystals 402, a bottom substrate 403 and spacers 404, 405. The spacers 404, 405 fix the separation distance between the top and bottom substrates and enclose the liquid crystal. The substrates 401, 403 include, or are in contact with, electronic control layers 406 and 407 that include integrated thin film transistors to control the electrodes 408 and 409. For example, the configuration I FIG. 4 can be an individual cell with a single set of electrodes, which can be used as a single grid element. The top and bottom waveguide cladding layers are 410 and 411. The top and bottom liquid crystal alignment layers are 412 and 413. The waveguide can be a single-mode or a multi-mode waveguide. As understood to those skilled in the art of integrated optics, the array of the electrodes can be further configured to create a waveguide configuration that operates as a waveguide interposer, a programmable delay line or a polarization or mode converter. An interposer can be constructed as an array of waveguides of spatially varying pitches connecting an array of waveguides of higher density to an array of waveguides of lower density. A programmable delay line can be constructed as a waveguide of a length determined by the desirable delay. A polarization or mode converter can be constructed as a waveguide of tapered width that is/are linear, exponential, polynomial or a combination thereof. Alternatively, a polarization or mode converter can be constructed as a waveguide of high index core with varying distribution of refractive index or birefringence controlled by different electrodes.

In some embodiments, the shape of the electrode is square, and the number of electrodes in a periodic array of a square or rectangular grid can be in the range 10 to 10 billion or higher. The grid, however, can have any shape, including but not limited to square, rectangular, triangular, round, oval, or other shapes that allow light to be delivered to the grid via one or more input ports, and to allow light to exit the grid via one or more output ports. In some embodiment, the dimensions of the electrodes are the same and can range from 0.5 to 5 microns. In some embodiments, the separation between the top and bottom substrates 401 and 403 can be 1 to 5 microns. The gap between adjacent electrodes on the same substrate can be a small fraction, 1 to 10 percent of the dimension of the electrode, determined by minimizing light propagation loss in the waveguide. In some embodiments, the shape of the electrode can be rectangular, quadrilateral or trapezoidal. The array of electrodes can be periodic or nonperiodic. In yet another embodiment, the shape of the electrode is a closed curve, and the electrodes are arranged to be non-overlapping and space-filling over a predefined area.

Figure 5:
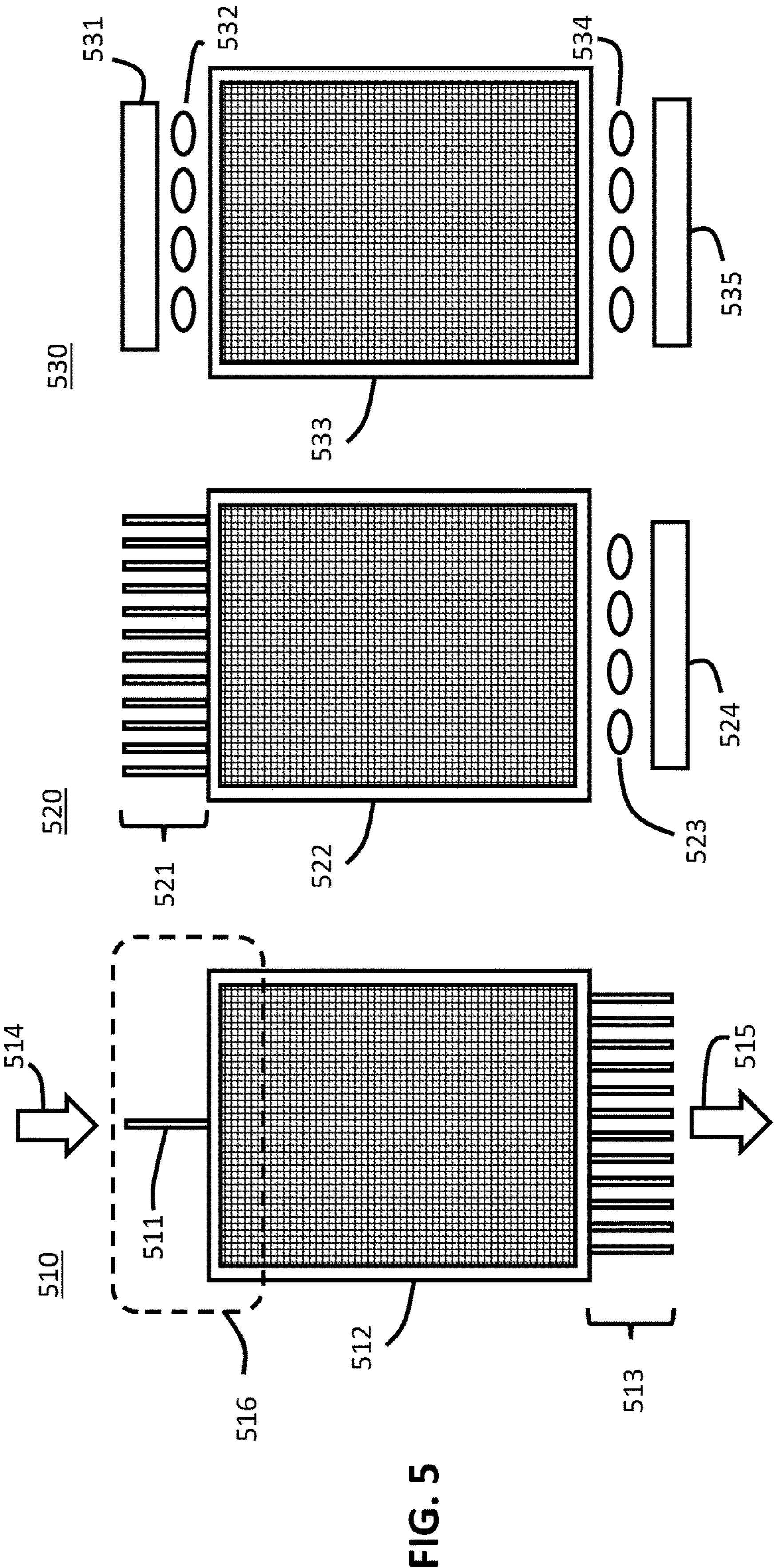
FIG. 5 illustrates three different connection and operation configurations of programmable waveguide devices in accordance with some example embodiments.

FIG. 5 shows the top views 510, 520 and 530 of three connection and operation configurations of the programmable waveguide devices in accordance with some example embodiments. In configuration 510 (left configuration), the edge of the device 512 is coupled to multiple optical fibers 511 (at one end) and 513 (at another end). The grid at the center of the device represents the array of electrodes, similar to those depicted in FIG. 3. Light 514 travels into the input optical fiber 511, which can be butt coupled into the device 512. The light is coupled from the device 512 to an array of output fibers 513 forming an output light 515. The amount of light that is coupled to the output fibers 513 depends on the applied voltages on the electrodes of the device 512. This configuration can be particularly advantageous in applications where a large number of output ports are needed.

Configuration 520 (middle) illustrates another example embodiment, in which the edge of the device 522 is coupled to multiple input optical fibers 521. Light propagates from the fibers 521 to, and through, the device 522 and is collected by an array of lenses 523 which focus the light onto an array detector 524. The amount of light incident on the array detector 524 depends on the applied voltages on the electrodes of the device 522. This configuration can be particularly advantageous in applications where a large number of input beams are present and relatively few output beams are needed. The free-space output interface eliminates the need for fiber coupling of the output beam.

In another example configuration 530 (right), light from an array of lasers 531 is focused by an array of lenses 532 onto the edge of the device 533. The laser light propagates through the device and to the other end, which is then is collected by an array of lenses 534 that focus the light onto an array detector 535. The amount of light incident on the array detector 535 depends on the applied voltages on the electrodes of the device 533. This configuration eliminates the need for fiber coupling at both the input and output stages.

Figure 6:
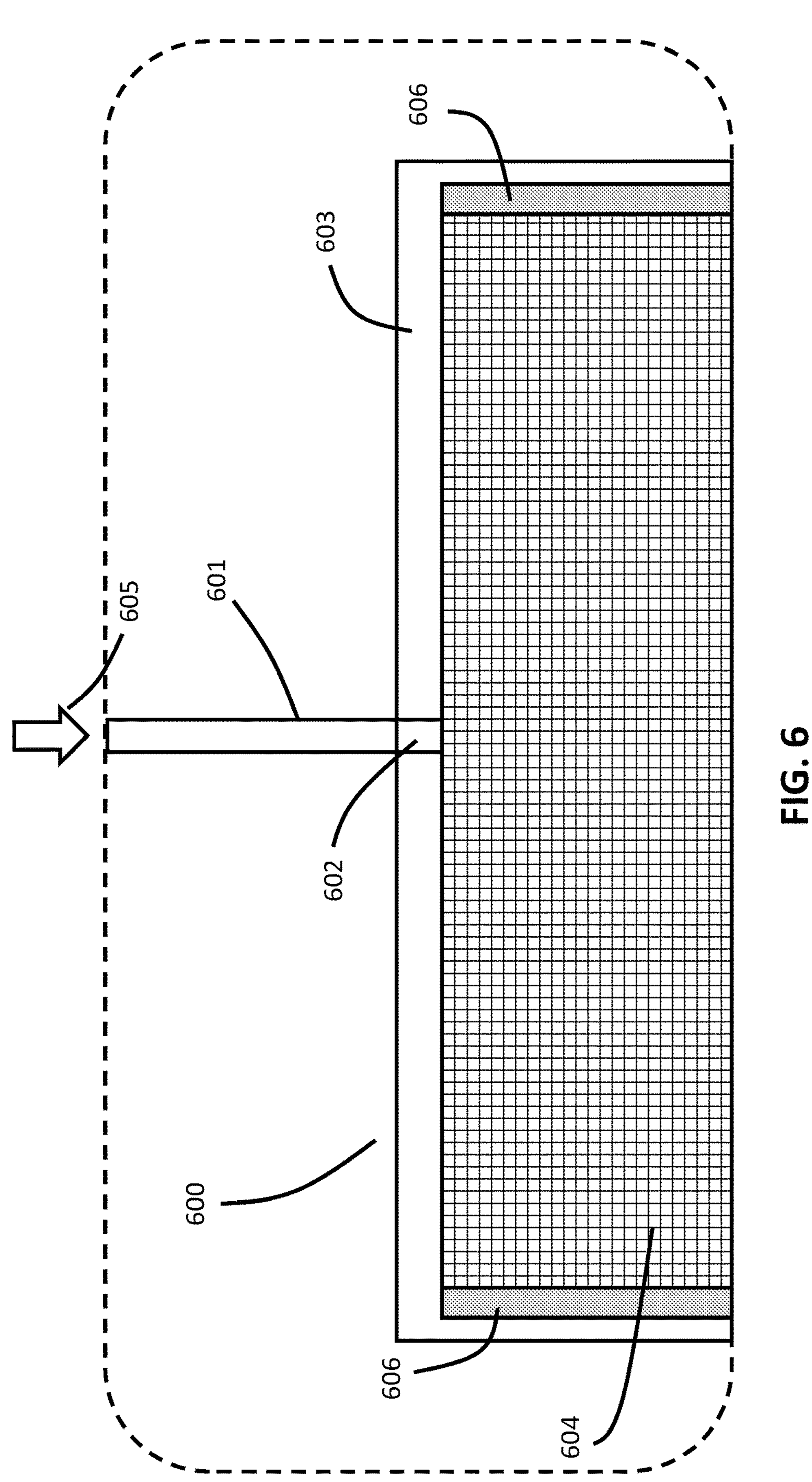
FIG. 6 illustrates a magnified a magnified portion of the device in FIG. 5.

FIG. 6 shows a magnified top view of an example region 516 of the device 512 of FIG. 5. Light 605 is coupled into an optical fiber 601 which is connected to the edge of the device 600. The configuration shows the location of the spacer layer 603 and the array of electrodes 604. A coupling waveguide 602 is fabricated in the spacer layer to facilitate light coupling between the optical fiber 601 and the electrode regions with the liquid crystal. In some embodiments, the coupling waveguide 602 is a slab waveguide similar to that shown in FIG. 2A and includes a high index core surrounded by lower index cladding. In other embodiments, the side of the electrode regions adjacent to the spacer layer 603 has absorption barriers 606 that reduce the amount of scattered light inside the cell.

Figure 7:
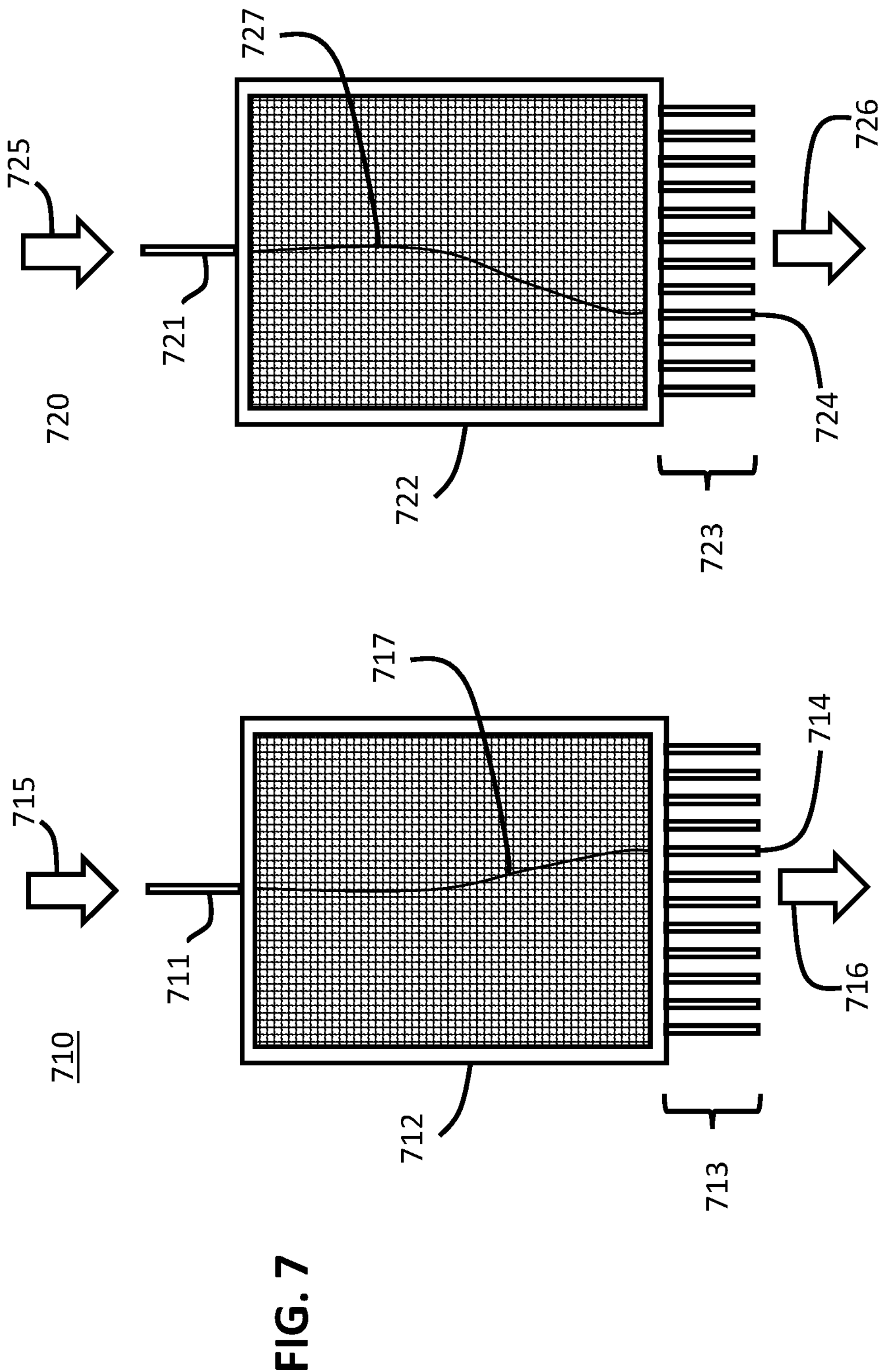
FIG. 7 illustrates a configuration and operation of a programmable waveguide device as an optical switch in accordance with an example embodiment.

In some example embodiments, the programmable waveguide devices disclosed herein can operate as an optical switch and splitter, as illustrated in the example configurations of FIG. 7 and FIG. 3 (rightmost configuration), respectively. In one configuration 710 (left-hand side of FIG. 7), input light 715 is coupled to an optical fiber 711 into the device 712. The electrodes are programmed to create a high index waveguide 717 that couples the input light to one output fiber 714 (see also, for example, the middle configuration in FIG. 3). In another configuration 720, input light 725 is coupled to an optical fiber 721 into device 722. The electrodes are programmed to create a high index waveguide 727 that couples the input light to another output fiber 724. By changing the voltages of the electrodes, it is possible to couple the input light to different output fibers 713 and 723.

Figure 8A:
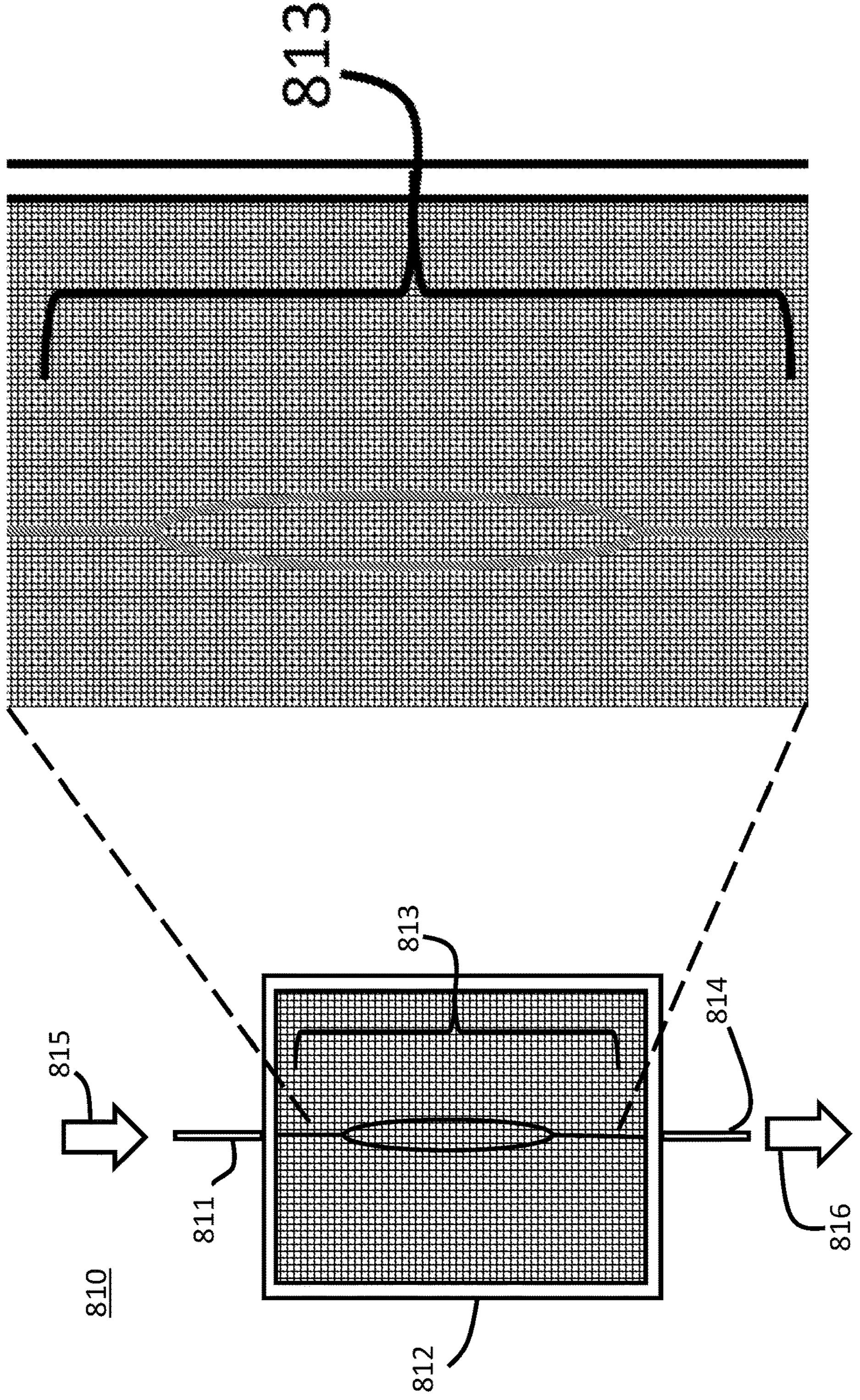
FIG. 8A illustrates a configuration and operation of a programmable waveguide device as a Mach Zehnder interferometer in accordance with an example embodiment.

In some example embodiments, the programmable waveguide devices disclosed herein can operate as a Mach Zehnder interferometer, as illustrated in the example configuration 810 in FIG. 8A. Input light 815 is coupled to an optical fiber 811 into the device 812. The electrodes are programmed to create a high index Mach Zehnder interferometer 813, in which the input light is split into two arms (see also, e.g., the right configuration in FIG. 3), and subsequently combined and coupled to the output fiber 814.

Figure 8B:
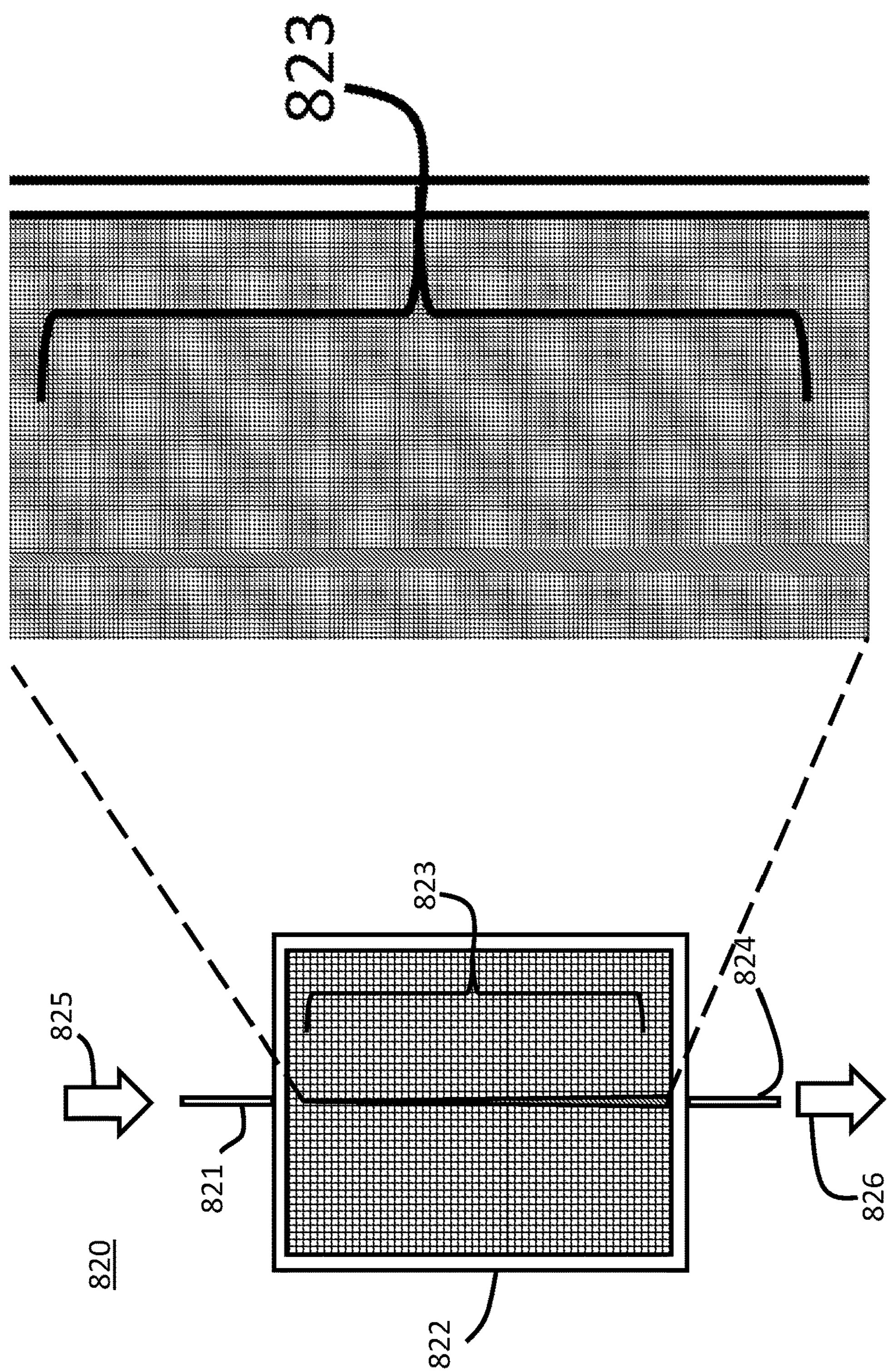
FIG. 8B illustrates a configuration and operation of a programmable waveguide device as an optical mode transformer in accordance with an example embodiment.

In some example embodiments, the programmable waveguide devices disclosed herein can operate as a mode transformer, as illustrated in the example configuration 820 in FIG. 8B. Input light 825 is coupled to an optical fiber 821 into the device 822. The electrodes are programmed to create a high index tapered waveguide 823 which operates as a mode transformer. For example, an output multi-mode light 826 may be produced using a single-mode input light 825. The output of the mode transformer is directed to the output fiber 824.

Figure 9:
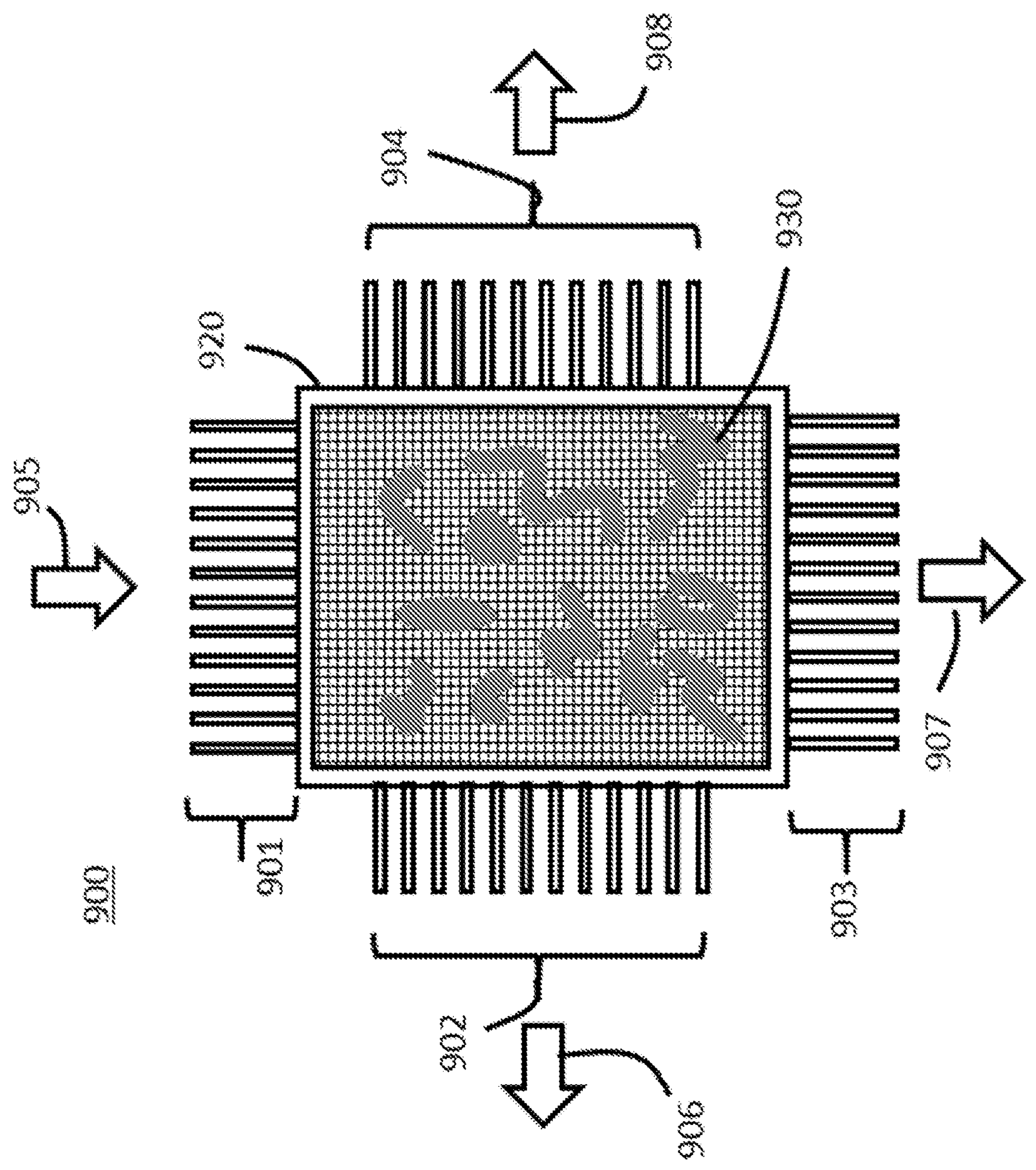
FIG. 9 illustrates a configuration and operation of a programmable waveguide device as a parallel optical computing device in accordance with an example embodiment.

In some example embodiments, the programmable waveguide device disclosed herein can operate as a parallel optical computer, as illustrated in the example configuration of FIG. 9. Input light 905 is coupled to an optical fiber array 901 and into the device 920. In some example configurations, the electrodes are programmed to create, for example, a high index distribution 930 inside the device. For example, in applications where inverse-designed structures are used for computing mathematical equations, the index distribution of the programmable waveguide device disclosed herein can be designed to have a transmission matrix equal to the kernels of the mathematical equations to be solved. Inverse-design structures can be characterized by a scattering matrix connecting a set of complex-valued input modes to a set of complex-valued output modes, which capture the operation of matrix multiplication. In accordance with the disclosed embodiments, arbitrarily-shaped regions of the programmable waveguide device can be configured to exhibit different indices of refraction. The distribution can be binary or grey scale depending on the applied voltages. For example, all regions labeled as 930 in FIG. 9 can have a high index of refraction (compared to the remaining regions of the device), or the index of refraction of one or more regions 930 can be different from the index of refraction of other regions 930. Output light can be coupled to optical fiber arrays 902, 903 and 904. In some embodiments, light may be coupled to one or more of the individual output fibers within each of the fiber arrays 902, 903 and 904. In other embodiments, light may be directed to one of more fibers within one or more of the fiber arrays 902, 903 and 904. The input light sets the parameters for the equations, and the output light represents the solution of the equations. The device can be used to solve simultaneous parallel solution of multiple mathematical equations.

In some embodiments, voltages on the electrodes of the programmable waveguide device can be configured to produce a step index profile (e.g., by setting a high-index region immediately adjacent to a low-index region). In other embodiments, the programmable waveguide device can be configured to produce a graded index profile (e.g., by applying no voltage to a center region and applying voltages that vary gradually as a function of distance from the center region). In some embodiments, voltages on at least some of the electrodes of the programmable waveguide device can be modulated or varied in time to produce regions with varying indices of refraction as a function of time.

In some embodiments, the liquid crystal in the programmable waveguide device can be thermotropic liquid crystal in nematic, smectic and/or cholesteric phase. The application of electric field creates a distribution of high and low refractive indices by changing the orientation of the liquid crystal molecules. In other embodiments, the materials between the top and bottom electrodes can be another electro-optic material, thermo-optic material, semiconductor or nonlinear crystal. Application of a DC or low-frequency electric field on an electro-optic material changes the refractive index of the material. The change of the refractive index, δn, is related to the applied electric field E by the equation:

$$\delta n = -\frac{1}{2}n^3 rE.$$

In the above equation, n, is the refractive index and r is the electro-optic coefficient. The electro-optic or Pockels effect occurs in non-centrosymmetric materials such as lithium niobate, gallium arsenide and strained silicon. Other electro-optic materials include electro-optic polymers with high hyperpolarizability, which can be deposited and poled on a substrate with predefined electrodes. In one operating mode, the electrodes generate an electric field that changes the refractive index of the material. In another operating mode, thermo-optic materials are used, and the electrodes generate heat that changes the temperature and refractive index of the material. Examples of thermo-optic materials for integrated waveguide are silicon oxynitride, silicon oxycarbide and silica.

Figure 10:
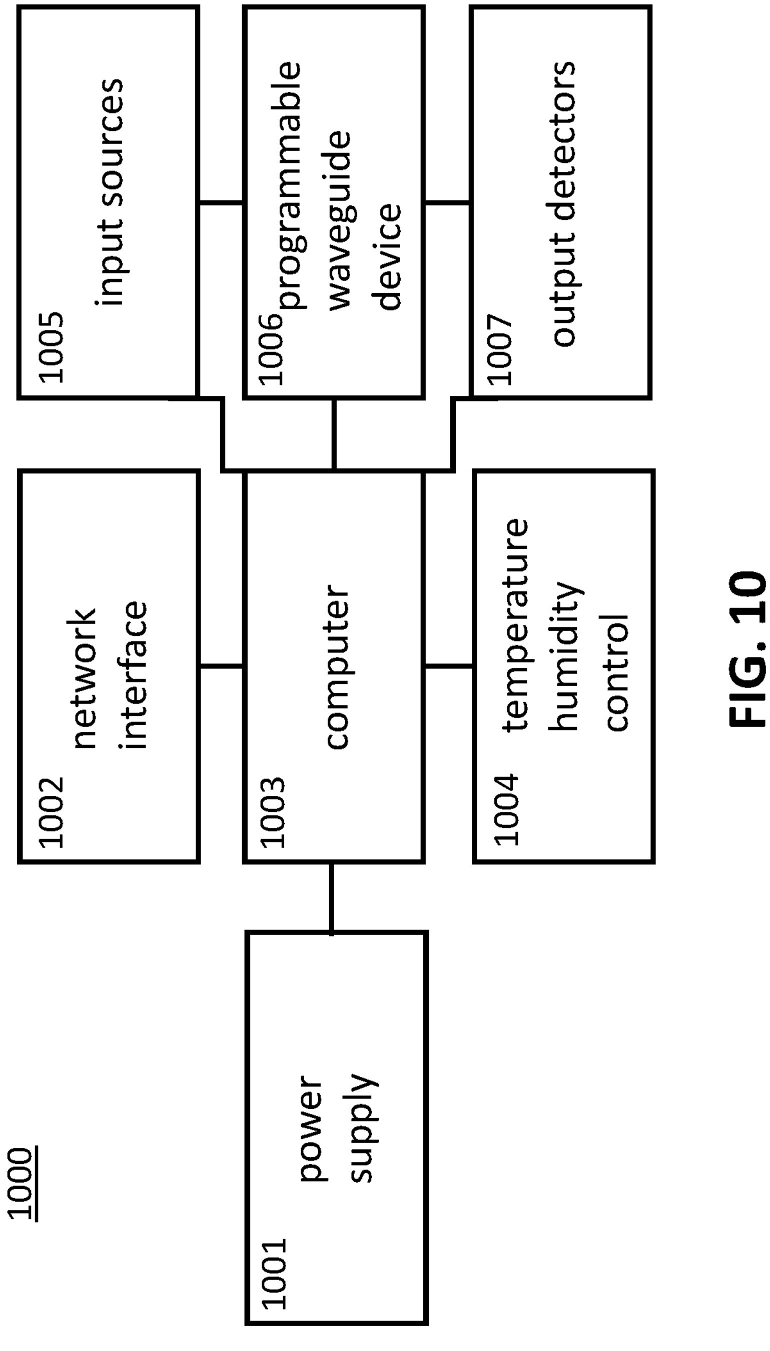
FIG. 10 illustrates a programmable waveguide device that is part of an optical computer system in accordance with an example embodiment.

In FIG. 10, the programmable waveguide device 1006 is part of an optical computer system 1000. The optical computer includes a power supply 1001, a network interface 1002, an electronic computer 1003, a temperature and humidity control system 1004, input light sources 1005 and output detectors 1007.

At least some of the operations disclosed in connection with the disclosed embodiments can implemented using a processer/controller (e.g., implemented as part of the computer 1003 in FIG. 10) that can be configured to communicate with one or more detectors (e.g., output detectors 1007 in FIG. 10), light sources (e.g., input sources 1005 in FIG.

10), voltage supplies (e.g., power supply 1001 in FIG. 10), heater or other components (e.g., temperature and/or humidity control 1004 in FIG. 10). In some embodiments, the processer/controller can be configured to communicate with, and control the operations of, the liquid crystal cells of the programmable waveguide device. The processor/controller can further include, or be coupled to, a memory that stores processor executable code that causes the processor/controller to generate and transmit/receive suitable information to/from the various system components, as well as suitable input/output (IO) capabilities (e.g., wired or wireless via the network interface 1003 in FIG. 10) to transmit and receive commands and/or data with to and from the active components/devices, the light sources, and imaging sensors/detector arrays which may be part of a camera and can include a CCD, a CMOS or another light sensing device. The processor/controller may receive the information associated with light sensing devices, and further process that information to produce data indicative of the results.

One aspect of the disclosed embodiments relates to a programmable waveguide device that includes a grid comprising an electro-optic material positioned between a plurality of top electrodes and a plurality of bottom electrodes. Each of the top electrodes and a corresponding one of the bottom electrodes form a pair of electrodes as part of a grid element and the grid includes a plurality of grid elements. The programmable waveguide device also includes one or more input ports configured to receive one or more input beams at one or more edges of the grid, and one or more output ports configured to output one or more output beams produced from the one or more input beams after propagation through the grid. One or more pairs of electrodes of each grid element of the programmable waveguide device is configurable to receive a voltage across the electro-optic material of the grid element. The electro-optic material exhibits a first index of refraction in the absence of the voltage and exhibits a second index of refraction different from the first index of refraction in the presence of the voltage. Further, the grid elements are configurable to produce regions within the grid with varying indices of refraction based on the voltage.

In one example embodiment, the first index of refraction is higher than the second index of refraction, and a first subset of the grid elements is configured to receive the voltage and a second subset of the grid elements is configured not to receive the voltage to form a path within the electro-optic material for guiding the one or more input beams from the one or more input ports to the one or more output ports. In another example embodiment, the path is a straight line across the grid to allow the one or more input beams to exit the grid without lateral displacement. In yet another example embodiment, the path is an angled or a segmented line across the grid such that at least one of the one or more output beams is laterally offset with respect to a corresponding one of the one or more input beams. In still another example embodiment, a first subset of the grid elements is configured to receive the voltage and a second subset of the grid elements is configured not to receive the voltage to form an interferometer configuration within the grid; the interferometer configuration includes a first section within the electro-optic material that is configured to split a single path of light into two paths, and a second section to combine the two paths into a combined path before allowing the one or more output beams exit the grid.

According to another example embodiment, a first subset of the grid elements is configured to receive the voltage and a second subset of the grid elements is configured not to receive the voltage to form a mode transformer within the grid; the mode transformer includes a tapered path across the electro-optic material that is configured to allow the one or more output beams exiting the grid with a larger number of modes compared to the one or more input beams. In one example embodiment, the voltage is a constant-valued voltage to enable establishment of a region within the grid having a step-index profile. In another example embodiment, the voltage is configured to vary within a predetermined range of voltage values to enable establishment of a region within the grid having a graded-index profile.

In another example embodiment, the voltage is configured to vary within a predetermined range of voltage values, and a first subset of the grid elements is configured to receive a first voltage value, a second subset of the grid elements is configured to receive a second voltage value, and a third subset of the grid elements is configured to receive no voltage value to establish regions with at least three different indices of refraction within the grid. In one example embodiment, the voltage is configured to vary within a predetermined range of voltage values, and wherein each of a plurality of subsets of the grid elements is configured to receive a voltage value within the predetermined range to form a plurality of regions having different indices of refraction. In yet another example embodiment, the plurality of regions having different indices of refraction correspond to a transmission matrix associated with kernels of at least one mathematical equation to be solved. In still another example embodiment, one or more of the plurality of regions is an arbitrarily-shaped regions.

In one example embodiment, the electro-optic material is a liquid crystal material. In another example embodiment, the electro-optic material is a thermotropic liquid crystal in one of a nematic, smectic or cholesteric phase. In yet another example embodiment, the electro-optic material is an electro-optic polymer. In still another example embodiment, the programmable waveguide device includes a top and a bottom substrate, a pair of spacers to maintain a fixed separation between the top and bottom spacers, and a first and a second electronic control layer, each electronic control layer integrated with thin film transistors to control the plurality of top and bottom electrodes. According to another example embodiment, the one or more input ports comprise one or more optical fibers and the one or more output port comprise one or more optical fibers, the one or more input ports comprise one or more optical fibers and the one or more output port comprise one or more lenses, or the one or more input ports comprise one or more lenses and the one or more output port comprise one or more lenses.

In another example embodiment, the one or more input ports comprise one or more optical fibers, and a coupling waveguide is positioned between an end of the one or more optical fibers and a section of the grid than includes the electro-optic material to facilitate light coupling. In one example embodiment, the programmable waveguide device further includes one or more absorption barriers along one or more sides of the grid to reduce an amount of scattered light within the grid. In yet another example embodiment, the programmable waveguide device is part of a system that includes a power supply, a computing device, one or more light sources and an output detector, wherein the computing device is configured to communicate with at least the programmable waveguide device.

Another aspect of the disclosed embodiments relates to a programmable waveguide device that includes a plurality of voltage-controllable liquid crystal elements formed as a grid having at least one input port for receiving an input polarized light beam and at least one output port to allow an output beam exit the programmable waveguide device. The programmable waveguide device also includes a plurality of electrodes, each associated with a corresponding voltage-controllable liquid crystal element and configured to receive a voltage from a voltage source within a predetermined range of voltage values. The liquid crystal elements of the programmable waveguide device exhibit a first index of refraction in the absence of the voltage and exhibit a different index of refraction upon application of the voltage; the voltage-controllable liquid crystal elements are configurable to form a first set of regions with differing indices of refraction within the programmable waveguide device based on a first set of voltage values that are applied to the voltage-controllable liquid crystal elements, and to form a second set of regions, different from the first set of regions, within the programmable waveguide device with differing indices of refraction based on a second set of voltage values that are applied to the voltage-controllable liquid crystal elements.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes Only a few implementations and examples are described and other implementations, enhancements and variations can be made based on what is described and illustrated in this patent document.

What is claimed is:

1. A programmable waveguide device, comprising:

a grid comprising an electro-optic material positioned between a plurality of top electrodes and a plurality of bottom electrodes, each of the top electrodes and a corresponding one of the bottom electrodes forming a pair of electrodes as part of a grid element, the grid comprising a plurality of grid elements;

a top and a bottom substrate, a pair of spacers arranged orthogonal to the top and the bottom substrates to maintain a fixed separation between the top and the bottom substrates, and a first and a second electronic control layer, each electronic control layer integrated with thin film transistors to control the plurality of top and bottom electrodes;

one or more input ports configured to receive one or more input beams at one or more edges of the grid; and one or more output ports configured to output one or more output beams produced from the one or more input beams after propagation through the grid, wherein one or more pairs of electrodes of each grid element is configurable to receive a voltage across the electro-optic material of the grid element, wherein the electro-optic material exhibits a first index of refraction in an absence of the voltage and exhibits a second index of refraction different from the first index of refraction in a presence of the voltage, and wherein the grid elements are configurable to produce regions within the grid with varying indices of refraction based on the voltage.

2. The programmable waveguide device of claim 1, wherein the first index of refraction is higher than the second index of refraction, and a first subset of the grid elements is configured to receive the voltage and a second subset of the grid elements is configured not to receive the voltage to form a path within the electro-optic material for guiding the one or more input beams from the one or more input ports to the one or more output ports.

3. The programmable waveguide device of claim 2, wherein the path is a straight line across the grid to allow the one or more input beams to exit the grid without lateral displacement.

4. The programmable waveguide device of claim 2, wherein the path is an angled or a segmented line across the grid such that at least one of the one or more output beams is laterally offset with respect to a corresponding one of the one or more input beams.

5. The programmable waveguide device of claim 1, wherein a first subset of the grid elements is configured to receive the voltage and a second subset of the grid elements is configured not to receive the voltage to form an interferometer configuration within the grid, the interferometer configuration including a first section within the electro-optic material that is configured to split a single path of light into two paths, and a second section to combine the two paths into a combined path before allowing the one or more output beams exit the grid.

6. The programmable waveguide device of claim 1, wherein a first subset of the grid elements is configured to receive the voltage and a second subset of the grid elements is configured not to receive the voltage to form a mode transformer within the grid, the mode transformer including a tapered path across the electro-optic material that is configured to allow the one or more output beams exiting the grid with a larger number of modes compared to the one or more input beams.

7. The programmable waveguide device of claim 1, wherein the voltage is a constant-valued voltage to enable establishment of a region within the grid having a step-index profile.

8. The programmable waveguide device of claim 1, wherein the voltage is configured to vary within a predetermined range of voltage values to enable establishment of a region within the grid having a graded-index profile.

9. The programmable waveguide device of claim 1, wherein the voltage is configured to vary within a predetermined range of voltage values, and a first subset of the grid elements is configured to receive a first voltage value, a second subset of the grid elements is configured to receive a second voltage value, and a third subset of the grid elements is configured to receive no voltage value to establish regions with at least three different indices of refraction within the grid.

10. The programmable waveguide device of claim 1, wherein the voltage is configured to vary within a predetermined range of voltage values, and wherein each of a plurality of subsets of the grid elements is configured to receive a voltage value within the predetermined range to form a plurality of regions having different indices of refraction, and wherein the plurality of regions having different indices of refraction correspond to a transmission matrix associated with kernels of at least one mathematical equation to be solved.

11. The programmable waveguide device of claim 10, wherein one or more of the plurality of regions is an arbitrarily-shaped regions.

12. The programmable waveguide device of claim 1, wherein the electro-optic material is a liquid crystal material.

13. The programmable waveguide device of claim 1, wherein the electro-optic material is a thermotropic liquid crystal in one of a nematic, smectic or cholesteric phase.

14. The programmable waveguide device of claim 1, wherein the electro-optic material is an electro-optic polymer.

15. The programmable waveguide device of claim 1, wherein:

the one or more input ports comprise one or more optical fibers and the one or more output port comprise one or more optical fibers, the one or more input ports comprise one or more optical fibers and the one or more output port comprise one or more lenses, or the one or more input ports comprise one or more lenses and the one or more output port comprise one or more lenses.

16. The programmable waveguide device of claim 1, wherein the one or more input ports comprise one or more optical fibers, and a coupling waveguide is positioned between an end of the one or more optical fibers and a section of the grid than includes the electro-optic material to facilitate light coupling.

17. The programmable waveguide device of claim 1, further including one or more absorption barriers along one or more sides of the grid to reduce an amount of scattered light within the grid.

18. The programmable waveguide device of claim 1, wherein the programmable waveguide device is part of an optical computer system that includes a power supply, a computing device, one or more light sources and an output detector, wherein the computing device is communicatively coupled to the programmable waveguide device to control an operation of the programmable waveguide device.

19. A programmable waveguide device, comprising:

a plurality of voltage-controllable liquid crystal elements formed as a grid having at least one input port for receiving an input polarized light beam and at least one output port to allow an output beam exit the programmable waveguide device;

a plurality of electrodes, each associated with a corresponding voltage-controllable liquid crystal element and configured to receive a voltage from a voltage source within a predetermined range of voltage values; and a top and a bottom substrate, a pair of spacers arranged orthogonal to the top and the bottom substrates to maintain a fixed separation between the top and the bottom substrates, and at least one electronic control layer integrated with thin film transistors to control the plurality of electrodes, wherein:

the liquid crystal elements exhibit a first index of refraction in an absence of the voltage and exhibit a different index of refraction upon application of the voltage, wherein the voltage-controllable liquid crystal elements are configurable to form a first set of regions with differing indices of refraction within the programmable waveguide device based on a first set of voltage values that are applied to the voltage-controllable liquid crystal elements, and to form a second set of regions, different from the first set of regions, within the programmable waveguide device with differing indices of refraction based on a second set of voltage values that are applied to the voltage-controllable liquid crystal elements.

* * * * *